L. W. WOOD.
TIRE.
APPLICATION FILED SEPT. 15, 1919.
1,348,614.
Patented Aug. 3, 1920.
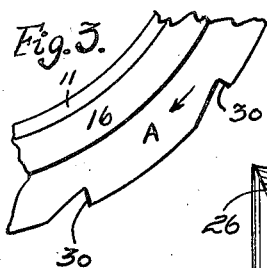
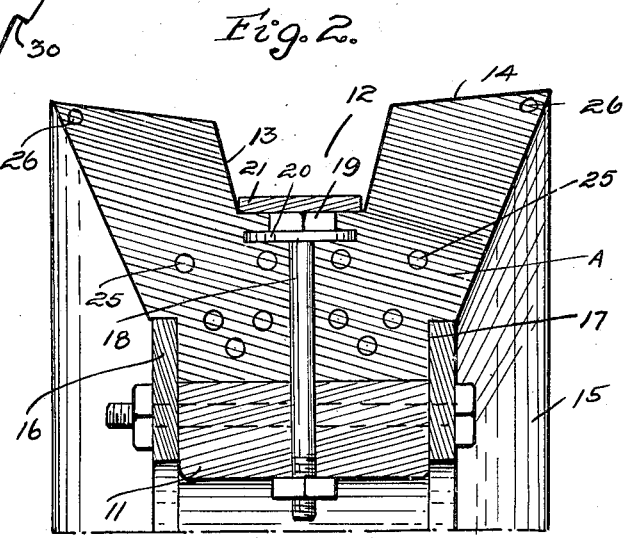
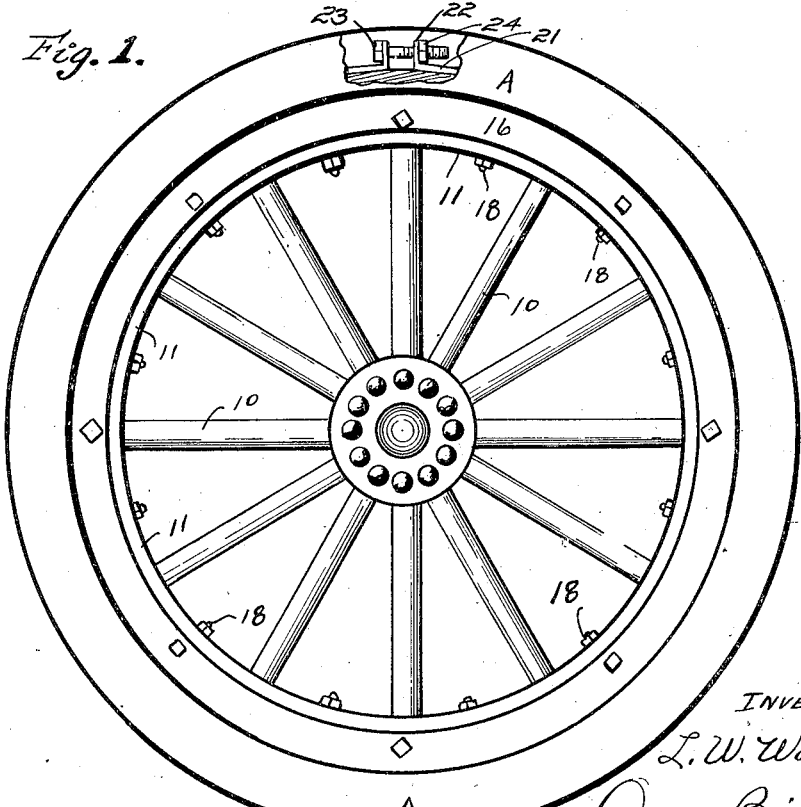
INVENTOR
L. W. Wood
BY George Bair Attys

UNITED STATES PATENT OFFICE.

LEANDER W. WOOD, OF FONTANELLE, IOWA.

TIRE.

1,348,614. Specification of Letters Patent. Patented Aug. 3, 1920.

Application filed September 15, 1919. Serial No. 323,980.

*To all whom it may concern:*

Be it known that I, LEANDER W. WOOD, a citizen of the United States, and resident of Fontanelle, in the county of Adair and State of Iowa, have invented a certain new and useful Tire, of which the following is a specification.

The object of my invention is to provide a resilient tire for vehicle wheels of simple, durable and inexpensive construction.

More particularly it is my object to provide a tire of the kind mentioned preferably made of rubber, designed to take the place of a pneumatic tire comprising a continuous solid rubber tire, having an exterior annular central groove with a resilient adjustable metal band therein.

Still a further object is to provide a tire of the general type mentioned, having in its tread surfaces, transverse grooves or walls of peculiar form adapted to give a better gripping tread member, and to facilitate easier travel.

With these and other objects in view, my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a wheel equipped with a tire embodying my invention, a portion of the tire being shown in cross section.

Fig. 2 shows a transverse, sectional view through the rim of the wheel, with the tire installed thereon; and Fig. 3 is a detailed view of a slightly modified form of my invention.

In the accompanying drawings, I have used the reference numeral 10 to indicate generally a vehicle wheel having the rim 11.

My improved tire comprises an annular rubber tire "A" having a longitudinal, central groove 12 in its outer tread portion. The walls of the groove 12 are beveled from their inner portions outwardly and laterally, as at 13. The tread portions of the tire, which engage the ground on the opposite sides of the groove 12, are slightly beveled from their inner edges outwardly, as at 14.

The sides of the tire are beveled slightly from their outer edges toward the center of the wheel, as at 15. The inner portion of the tire projects inwardly and sets on the rim 11 between two metal rings 16, which are bolted to the rim and project radially outwardly therefrom into rabbets 17 at the sides of the tire, as clearly illustrated in Fig. 2.

Extended through the tire and projecting radially inwardly therefrom are bolts 18, which extend through the rim and are fastened thereto. The heads 19 of the bolts 18 and the washers 20 adjacent to said heads are set into the tire at the bottom of the groove 12. Snugly received in the bottom of the groove 12 is an annular, resilient metal band or ring 21, having its adjacent ends provided with oppositely extending flanges 22, which are adjustably connected together by means of a bolt 23 and a nut 24. The band 21 is a wide flat band as shown in Fig. 2.

In the installation of the tire on the wheel, one of the rings 16 may be removed and the tire may then be slid onto the rim. The tire may be stretched or sprung sufficiently for permitting the insertion of the inner ends of the bolts 18 through the holes in the rim. The nuts may then be assembled on the bolts 18. The flange 16 is placed in position and fastened by means of the bolts and nuts provided therefor.

The ring or band 21 is then sprung sufficiently to mount it on the tire in the groove 12, and thereafter the ends of the band 21 are drawn tightly together by means of the bolt 23 and nut 24.

The tire may be provided with reinforcing wires or the like 25. I preferably provide the tire at its outer radial edges with reinforcing wires 26.

The tire is broader at its outer tread portion than at its portion adapted to fit the rim, and has the circumferential, central, annular, external groove, the walls of which are inclined from the perpendicular, as shown in the drawings. The groove is narrower at its bottom than at its outer portion, and the tread portion of the tire is inclined from the edge of said groove laterally and radially outwardly, as illustrated.

It will be seen that on account of the beveled edges 14 and the groove 12, I have provided a tire which will not easily skid. Furthermore, the shape of said beveled surfaces is such as to reduce the shock of traveling on rough roads. In traveling over the ground with the tire of this type, it will be seen that where the tire travels over pebbles or small stones, the shock will not be readily transmitted through the wheels, but will tend to be distributed over the rubber tire.

It will be noted that on account of the arrangement of the beveled surfaces 14, the relative sharp, outer edges of the tire will engage the ground for preventing any side skidding.

In Fig. 3, I have shown a slightly modified form of the invention, in which the tread surfaces of the tire are provided with cross grooves or slots 30, each preferably having one wall arranged substantially radially of the wheel and the other beveled as illustrated in Fig. 3. These grooves serve a double purpose. They afford gripping members for traveling in the mud or the like, particularly on account of the arrangement of the walls of the grooves 30, which serve to grip the ground when the wheel travels in the direction indicated by the arrow in Fig. 3. These grooves also serve to cushion the action of the wheel, just as do the beveled surfaces 14.

Some changes may be made in the construction and arrangement of my improved tire without departing from the real spirit and purpose of my invention, and it is my intention to cover by my claims any modified forms of structure or use of mechanical equivalents, which may be reasonably included within their scope.

I claim as my invention:

1. In a device of the class described, an annular resilient tire designed to fit on a wheel rim, said tire being broader at its outer tread portion than at its portion adapted to fit the rim, said tire having a circumferential, central, annular, external groove, the walls of said groove being inclined from the perpendicular, the groove being narrower at its bottom than at its outer portion, the tread portion of said tire being inclined from the edges of said groove laterally and radially outwardly, and a flat reinforcing band received in said groove, said band being of resilient material.

2. In a device of the class described, an annular resilient tire designed to fit on a wheel rim, said tire being broader at its outer tread portion than at its portion adapted to fit the rim, said tire having a circumferential, central, annular, external groove, the walls of said groove being inclined from the perpendicular, the groove being narrower at its bottom than at its outer portion, the tread portion of said tire being inclined from the edges of said groove laterally and radially outwardly, a flat reinforcing band received in said groove, said band being of resilient material, and reinforcing members embedded in said tire member near the lateral edges of the tread portion thereof.

Des Moines, Iowa, September 10, 1919.

LEANDER W. WOOD.